United States Patent
Lanitz et al.

(10) Patent No.: US 6,548,428 B1
(45) Date of Patent: *Apr. 15, 2003

(54) POLYMER-COATED MULTI-LAYER MATERIAL AND PROCESS FOR PRODUCING IT

(75) Inventors: Siegfried Lanitz, Markelstrasse 40, Berlin (DE), D-12163; Heinz Piesold, deceased, late of Leipzig (DE), by Rosemarie Piesold, legal representative

(73) Assignee: Siegfried Lanitz, Berlin (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/669,358

(22) PCT Filed: Oct. 30, 1995

(86) PCT No.: PCT/DE95/01526

§ 371 (c)(1), (2), (4) Date: Aug. 8, 1997

(87) PCT Pub. No.: WO96/14208

PCT Pub. Date: May 17, 1996

(30) Foreign Application Priority Data

Nov. 2, 1994 (DE) .......................................... 44 39 031

(51) Int. Cl.[7] .......................... B32B 27/04; B32B 27/18
(52) U.S. Cl. ........................... 442/149; 442/59; 442/83; 442/281; 442/287; 156/244.17; 156/244.23; 156/272.6; 427/307; 428/340; 428/475.2
(58) Field of Search ................... 442/59, 287, 149, 442/281, 83; 156/244.17, 244.23, 272.6; 428/475.2, 340; 427/307

(56) References Cited

U.S. PATENT DOCUMENTS

| | | | |
|---|---|---|---|
| 3,388,651 A | 6/1968 | Axelrod | 446/34 |
| 4,801,487 A | 1/1989 | Kalus et al. | 428/206 |
| 4,824,699 A * | 4/1989 | Woo et al. | 427/307 |
| 4,997,688 A | 3/1991 | Hardman | 428/34.9 |
| 5,084,340 A | 1/1992 | Light | 428/327 |
| 5,118,558 A * | 6/1992 | Mater et al. | 428/252 |
| 5,126,193 A | 6/1992 | Light | 428/327 |
| 5,126,194 A | 6/1992 | Light | 428/327 |
| 5,126,195 A | 6/1992 | Light | 428/327 |
| 5,198,306 A | 3/1993 | Kruse | 428/481 |
| 5,310,591 A | 5/1994 | Dodge et al. | 428/195 |
| 5,310,595 A | 5/1994 | Ali et al. | 428/206 |
| 5,518,809 A | 5/1996 | Henry et al. | 428/327 |
| 5,520,764 A * | 5/1996 | Toney et al. | 156/244.17 |
| 5,567,533 A * | 10/1996 | Toney et al. | 428/475.5 |

FOREIGN PATENT DOCUMENTS

| | | |
|---|---|---|
| DE | 285247 | 5/1914 |
| GB | 1104353 | 2/1968 |

* cited by examiner

*Primary Examiner*—Terrel Morris
*Assistant Examiner*—John J. Guarriello
(74) *Attorney, Agent, or Firm*—Pennie & Edmonds LLP

(57) ABSTRACT

The invention consists of a multilayer material and a process for manufacturing this material. The multilayer material comprises a polyester substrate which is provided with a thermoset plastic polymer coating and a layer of contact adhesive. The polymer coating is produced by a reaction between a polyurethane polymer containing hydroxyl groups and a low molecular linear polyisocyanate, with catalytic tin-organic additives and colorants. The multilayer material is resistant to tearing and is also weather-resistant. A transparent, reactive layer, consisting, for example of a layer to take toner or ink, or a metallic layer, can be deposited on the side opposite to the polymer-coated substrate. Multilayer materials of this kind are suitable for large-scale covering of supporting frameworks in the construction of model aircraft and are also suitable as a medium onto which images and print may be applied using a plain paper copier, and can also be used to carry advertising.

23 Claims, 1 Drawing Sheet

U.S. Patent
Apr. 15, 2003
US 6,548,428 B1
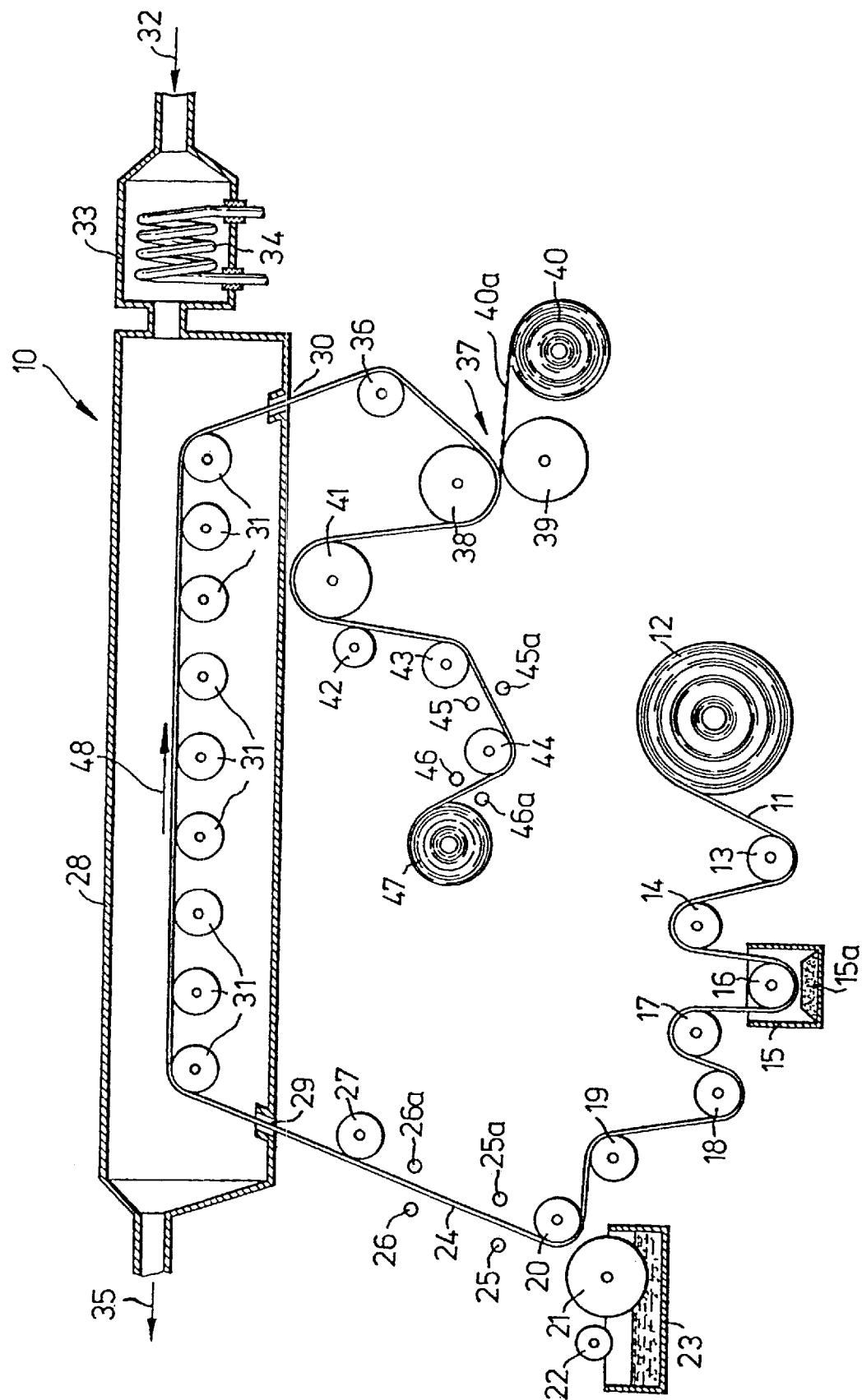

POLYMER-COATED MULTI-LAYER MATERIAL AND PROCESS FOR PRODUCING IT

FIELD OF THE INVENTION

The invention refers to a multilayer material, consisting of a heat-activated substrate with a defined shrinkability on a polyester base, coated with a polymer and, if necessary, with a thermoplastic contact adhesive and, if necessary, coated with a layer for receiving toner or ink, or with a metallic coating.

FIELD OF THE INVENTION

Multilayer materials of this kind are suitable for covering large areas over a supporting framework in the construction of model aircraft and of one-man aircraft/ultralight aircraft. However, they are also suitable as a medium onto which images and print may be applied using a plain paper copier, and are used as weather-resistant, self-adhesive labels and marking materials and in advertising.

Because of their physical and chemical properties, coloured polyester films, made for example from polyethylene terephthalate are suitable for covering large areas on model aircraft, and are well known in this field. Due to their weather-resistant properties and resistance to heat, such films, when coated on one side with a layer for receiving toner or ink, can be used as a medium onto which images or print can be applied using a plain paper-copier.

Normal technical solutions involve coating transparent polyester substrates with a heat-activated, pigmented and/or coloured polymer adhesive layer. In addition there are polyester substrates in which a pigmented, thermoset polymer layer is bonded with the substrate by means of a thermoplastic polymer layer, with another thermoplastic polymer layer applied as an adhesive layer. Such films tend to be relatively heavy.

Fibrous supporting materials woven from polyester and impregnated with resin are also used in model aircraft construction to cover the wooden framework. The resinous solvents that are used can be coloured with pigments and/or organic colorants.

One disadvantage of these common technical solutions is, for example, the noticeable decline in the adhesive strength of those materials which are coloured by the application of pigmented adhesives. Moreover, the visual impact of, the covering material produced in this way depends largely on the conditions under which it is used and processed, thus making it impossible to guarantee consistent quality. Because of the thermoplasticity of such adhesives, when material is stretched over corners and edges cracks may occur in the pigment, with splits at the corners of the coloured/adhesive layer. Accidental contact with the adhesive layer and/or when adjustments are made to the covering material may spoil the continuity of the pigment structure.

Minute holes may be formed in the pigment layer of polyester films if their thermoset layer of pigment is embedded between two thermoplastic polymer layers, i.e. between the adhesive and its base. These are caused by a reaction in polyurethane systems between the hardener, such as isocyanate, and the thermoplastic adhesive layer. The reaction process releases gases (e.g. $CO_2$, water), which then affect the pigment layer, forming minute holes.

Layers of toner are usually formed by applying bicyclical alkyl-, 1-12-C aliphatic alkyl or aromati-(meth)-acrylate with up to 20% of a polar monomer or N,N-dialkyl-monoalkylamino-alkyl-(meth)-acrylate. Solutions of polymerised diol-di-(meth)-acrylate are also used, with additives consisting of copolymerised vinyl monomer and copolymerised vinyl ester, (meth)-acrylic esters and/or styrol. Transparent, aqueous layers that can accept toners and are made of water-soluble polymers, with polymer particles measuring between 1 and 15$\mu$ and with additives consisting of antistatic agents are also frequently used. Toner fixing layers are also used, made from polyvinylacetal resin with a degree of acetalisation of between 20–40 mol %. Furthermore, well known are water-soluble cellulose polymers containing non-ionic or ionic materials which are suitable for the production of transparent toner layers on polyester, e.g. Melinex or Hostaphan film.

And finally, clear polyester films with layers that can accept ink are also used, and are made up of vinyl, pyrrolidone particles of a polyester, a co-polymer of a 2-6-C alkylenoxide, a polyvinyl alcohol and inert particles. Current technology also means that viable films can also be made from polyethylene, polypropylene and polycarbonate, coated on one side to set the ink, and that this coating consists of emulsions/dispersions of vinyl chloride-vinyl acetate-copolymer resin. In general additives consisting of colloidal silicon oxide offer the best possible means of preventing the finished material from sticking.

A disadvantage of the films referred to above is that, depending on the type of application, and despite the fact that polyester films and non-woven materials are in principle suitable as the basic materials for weather-resistant coverings for model aircraft, and are resistant to tearing, such materials can only cover a limited area, and have a restrictive load-to-weight ratio. This means that they cannot be used for one-man aircraft.

Materials provided with the toner layers referred to above range from clear to opaque, and copies can be made in black on a transparent and/or opaque background. However, because of the transparency of the material they are of limited effectiveness or totally ineffective for advertising purposes.

SUMMARY OF THE INVENTION

The task of this invention is to improve the performance characteristics of heat-activated, coloured, shrinkable films on a polyethylene therephtalate base. Depending on the area of application of the film, in accordance with this invention, the film is polymer coated, firstly to enhance the surface finish of the thermoset pigmented film, to improve the tear-resistance of the film and to reduce the area weight, and secondly new areas of application are to be opened up by providing the film with a coloured backing, at the same time coating one side of the film with an impact adhesive. The purpose is also to coat the film in such a way that it can be used with copying systems.

DETAILED DESCRIPTION OF THE INVENTION

A multilayer material and method of making same that overcomes the above disadvantages has now been discovered. In accordance with this invention, the multilayer material demonstrates improved performance characteristics with surprising effects when processed, as well as better resistance to tearing, and superior weather-resistance, compared with normal materials. In particular, as a result of so-called corona pre-treatment of the substrate, the film surface is modified in such a way ("roughened") by chemical and physical methods that the bonding between the polymer coating and the substrate is substantially improved compared with normal methods. This is evident in the fact that the polymer coating is more effectively bonded to the film. However, this is subject to the precondition that the polymer coating process takes place immediately after the corona treatment.

The introduction of coloured pigments and/or fluorescent pigments and/or organic colorants to the reaction mixture, which consists of a hydroxy group polyurethane, preferably with hydroxyl groups in the final stage, and a low molecular weight linear polyisocyanate in a ratio of 20:1 with reference to solid polyurethane polymer, as the cross-linking agent, ensures a very homogenous coloration of the polymer layer. In accordance with this invention, a catalytic additive consisting of a tin-organic compound is used, reducing the polymerisation time to approximately 48 hours, compared with a period of several days if no catalyst is used.

The contact adhesive layer is applied using the well-known transfer method, in which contact adhesive materials are used on a polyacrylic basis in a commonly used composition. This is applied in solution to silicone paper, and after the solvent has evaporated it is bonded with the substrate under heat and pressure.

According to the invention, the side of the substrate opposite to the polymer coating is provided with a transparent reactive layer. This layer may be suitable for receiving toner or ink, and should preferably be of vinyl acetate, with the toner layer consisting of a substrate with a thickness of between 2 and 8 g/m.$^2$ This creates a polymer film with a compact or translucent coloured backing, which can be used with a plain paper copier to accept images and printing, without adversely affecting the quality of the text and/or images thus reproduced. Such films are also ideal for advertising purposes because, as mentioned previously, the pigment is distributed homogeneously throughout the polymer layer, and they are also very weather-resistant due to the thermoset properties of the film.

In order to keep the so-called blocking effect on the toner or ink compatible layers to a minimum, if necessary between 0.5 and 5% of a suitable agent for preventing this effect is dispersed. Such agents may consist, for example, of colloid silicon dioxide or alternatively—in the case of aqueous dispersions—of up to a maximum of 3% rice starch. The reactive layer may be light-sensitive, thus opening up other possible uses.

Moreover, in accordance with the invention, it is intended that the side of the film opposite to the polymer coating should be provided with a thin metallic layer, i.e. <1$\mu$, made preferably of aluminium and/or chromium. This enables the area weight of the film to be substantially reduced. By applying the metallic layer to the coloured, transparent film the latter appears coloured but not translucent. Compared with existing methods for producing such coloured films, the system referred to in this invention can enable weight reductions of between 25 and 30% to be achieved, while the chemical and physical properties remain unchanged.

Another task is to find a process for producing the multilayer material. In accordance with the invention, these measures have resulted in a process that ensures that the multilayer material maintains a consistent quality. In accordance with the invention, if necessary, a reactive layer is applied to the side of the substrate opposite the polymer and contact adhesive coating, consisting, for example, of a layer suitable for taking toner or ink, and that, if necessary, an agent can be dispersed in this layer to avoid a blocking effect on the film. In accordance with the invention the film is fed past ionising rods in order to avoid or reduce the electrostatic charge that is built up on the substrate through friction against the rolls, causing the static on the substrate to be discharged again. An alternative is to apply a metallic layer using the vacuum vaporisation method.

Other advantageous measures are described in the other sub-claims. The invention is presented using examples of the processes involved, and in the accompanying drawing, and is described in greater detail below.

A.

The single illustration shows the stages in the process in diagram form, in Appendix 10. To apply the colour coating a substrate 11 made of polyethylene terephthalate is continuously unrolled from a reel 12, and fed through guide rolls 13 and 14 to a unit 15 (a so-called corona discharge unit), containing a roll 16. The substrate 11 is wound around this roll 16 in such a way that its surface is positioned facing the device 15a, which is used to treat the surface of the substrate. The period of treatment is determined by the circumference and rate of rotation of the roll 16. The corona discharge unit 15 can be incorporated in the process, i.e. if needed the unit can be connected up, according to the particular stage of the process.

Following corona treatment of the substrate 11 it continues over the guide rolls 17, 18 and 19 to a pair of rolls, consisting of a rubber roll 20 and a chromium plated steel roll 21. The roll 21 serves as pick-up roll and rotates in a trough 23. The (coloured) polymer mixture is contained in this trough 23, and is applied to the pick-up roll 21 by a doctor roll fitted with doctor blades (not shown) to ensure that the correct amount is applied.

Once the film 24 has been coated (with pigment) it is fed through parallel pairs of ionising rods 25, 25a and 26, 26a, to reduce or eliminate the electrostatic charge that is built up through the friction of the rolls. The film 11, 24 is fed over the system of rolls 27, 31 and 36 and through a drying tunnel, which is provided with an inlet 29 and outlet 30, in which the solvent, for example toluol, is vaporised. Heated air is blown through the drying tunnel 28, the incoming air 32 being heated to a specified temperature by the heating spirals 34 of a heating unit 33. The exhaust air 35 is removed from the system. The films 11, 24 are dried using the counter-current process 32, 35, 48.

The film is then fed through a system of rolls 38, 41, 42, 43 and 44 to a winder roll 47, the roll 41 being fitted with a cooling device (not shown), to cool the heated film, thus preventing blocking of the films and/or preventing them from sticking together. The films are once again fed through parallel pairs of ionising rods 45, 45a and 46, 46a to reduce or eliminate the build up of an electrostatic charge.

B.

A slightly modified process in the same installation 10 is used to wind paper 11, which is silicone coated on one side, from the reel 12. This paper is then fed to the rubber roll 20, where, in this process, the film 11 is coated with contact adhesive. For this purpose the trough is loaded with the appropriate adhesive mixture (not shown), which is transferred to the film 11 by means of the doctor roll 22 and pick-up roll 21. The corona discharge unit is not used in this process. The amount of coating can be controlled or dosed by varying the pressure of the pick-up roll 21 on the rubber roll 20. Analogous to process A, the coated film 11 is dried in the drying tunnel 28 and is then dispatched to a laminating device 37, which is not connected in process A. The laminating device 37 consists of a steel roll 38, which can be heated, and a hard rubber roll 39. The film 11 is fed between these two rolls 38 and 39. At the same time a web 40a, coated in pigment in accordance with process A, runs through the laminating device 37 from an unwinding device 40. The pressure of the rolls 38, 39 and the heat from the steel roll 38 causes the transfer of the adhesive from the silicone paper to the coloured film. The multilayer material produced in this way is then fed once again over the cooling roll 41, and over the guide rolls 42, 43, 44 to the winding roll 47. Analogous to process A, in this process the build up of static electricity is discharged by the ionising rods 25, 25a, 26, 26a, 45, 45a, 46, 46a.

C.

Analogous to processes A and B, the trough 23 can also be supplied with a mixture which is suitable for the application of a reactive layer, for example one that is suitable for taking toner or ink. This alternative process is carried out immediately after the film 11, 24 is coated with adhesive.

D.

The film 11 can also be bonded with a non-woven polyester or with woven fabric in order to improve its mechanical properties, in particular the resistance to tearing. This alternative process takes place prior to the coating with the thermoset colour layer, in the same way as in process A. In this case the trough 23 is supplied with the adhesive mixture and, after the film 11, 24 has been coated with adhesive and dried, it is laminated with a non-woven or woven material 40a in the laminating device 37. Coating with the thermoset colour layer then takes place.

E.

Analogous to the previous processes, the coloured, transparent polyethylene terephthlate film, which has a thickness of up to 10µ, is also provided with a thin aluminium layer (<1µ), which is applied using the vacuum vaporisation process (not shown). The vaporisation should not take place until a hardening period of at least 48 hours has elapsed.

According to this invention, it should be possible for all the stages of the process to be performed in one single installation. These individual stages of the process can be carried out in some cases in an uninterrupted sequence. In other cases they have to be carried out successively, after the supply of materials has been changed.

PROCESS EXAMPLE 1

10–15 percentage weight of a polyurethane polymer with final hydroxyl groups with a hydroxyl value $\leq 5$ are dissolved in toluol with a water content of <0.1%. For coloration 12–15 per cent in weight of a coloured pigment such as titanium oxide, and/or a fluorescent pigment and/or an organic colorant are dispersed in this solution. Up to 1 percent in weight, calculated as a solution of a low-molecular weight polyisocyanate and up to a maximum of 0.05 per cent by weight of a tin organic compound are added to this solution as a catalyst. At a wet weight which, depending on the pigment, ranges between 12 and 30 g m²—in the case of titanium dioxide, for example, it is 30 g/m²—this colour solution is diluted using toluol in a DIN beaker using a 4 mm nozzle with a maximum run-off time of 90 sec. The solution is then applied mechanically, using standard roll applicator systems, to polyethylene therephthalate film (PETP film), which has been pre-treated in a corona discharge unit immediately beforehand. The PETP film has a defined shrinkage of approx. 5% both horizontally and vertically. The colour solution is dried at a maximum temperature of 80° C. to retain the shrinkability of the PETP film. The film is simultaneously set during this drying process. The quantity of dried colour coating amounts to between 15 and 30 g/m² of the PETP film, depending on the pigment. Following intermediate storage for 48 hours at room temperature, which should not exceed 35° C., a contact adhesive is applied at 21 g/m²±1 g by means of transfer coating. The chosen adhesives are contact adhesives on the basis of polyacrylates in a commonly used composition. These are applied in solution to silicone paper, and after the solvent has evaporated they are bonded to the PETP film under heat and pressure. When the finished material has cooled the contact adhesive is bonded with the thermoset plastic colour coating and, until processing by the user takes place, this silicone paper serves to protect the applied coatings from scratches and from dust particles.

PROCESS EXAMPLE 2

The process takes place as in Example 1. The layer suitable for taking toner or ink is applied to the top side of the film immediately after it has been coated with contact adhesive. This is achieved using a solution of polyvinyl acetate in toluol, diluted further with toluol in a DIN beaker up to a run-off time of 16 sec., using a 4 mm nozzle. The solvent is evaporated off at a temperature of between 80 and 85° C. The quantity applied amounts to between 2 and 8 g by dry weight per m² of film.

PROCESS EXAMPLE 3

The process takes place as in Example 2, with between 0.5 and 5% colloidal silicon dioxide being added to the layer intended for the application of toner or ink, to prevent the blocking effect on the film. The silicon dioxide is introduced using a dispersion disc.

PROCESS EXAMPLE 4

The process described in example 1 is repeated, but in this case the PETP film is bonded with non-woven polyester prior to coating, in order to improve the mechanical properties, and in particular the tear-resistance. A 2-component adhesive on a polyurethane base, dissolved in toluol, is used to laminate the PETP film with the non-woven material. Thirty minutes before the solution is processed, it is mixed with 1 percent by weight, calculated on the basis of the polyurethane solution of a low molecular weight polyisocyanate, NCO content 11.5%. Evaporation of the solvent takes place at 80° C. Following storage for 48 hours under room conditions, the colour solution is applied to the substrate, followed by the application of the contact adhesive, as in Example 1.

PROCESS EXAMPLE 5

The process described in Example 1 is repeated, but instead of the contact adhesive, a heat-activated adhesive is applied to the polymer coating of the substrate. The heat-activated adhesive consists of a solution of linearly structured polyurethane polymer containing hydroxyl groups with a hydroxyl value of $\leq 5$, in toluol. The dry coating of adhesive should amount to between 21 and 25% g/m² of the film. The solvent evaporates at between 80 and 100° C. As explained in Example 1, the transfer process is used to apply the heat-activated adhesive.

PROCESS EXAMPLE 6

The process described in Example 1 is repeated: a coloured, transparent PETP film (thickness 5–10μ) is provided with an aluminium layer (thickness<1μ) using the vacuum vaporisation process. Films produced in this way are then provided with a heat-activated polyurethane adhesive, using the transfer process. The adhesive is produced by dissolving 12–15 per cent by weight of a polyurethane polymer with a hydroxyl value ≦5 in a mixture of toluol and thethyl ketone, in a ratio of 9:1.

The heat-activated polyurethane adhesive can also be replaced by a contact adhesive on a polyacrylate base, using a standard composition.

REFERENCE SYMBOLS 10 plant for producing a multilayer material
11 substrate
12 reel
13 guide roll
14 guide roll
15 corona discharge unit
15a device for surface treatment
16 guide roll for 15
17 guide roll
18 guide roll
19 guide roll
20 rubber roll
21 pick up roll
22 doctor roll with blade
23 trough for polymer coating
24 coated film
25 ionising rod
25a ionising rod
26 ionising rod
26a ionising rod
27 guide roll
28 drying tunnel
29 inlet aperture
30 outlet aperture
31 guide rolls for 28
32 incoming air
33 heating unit
34 heating coils
35 exhaust air
36 guide roll
37 laminating device
38 heated steel roll
39 rubber roll
40 roll with coated film web or non-woven material
40a coated film web or non-woven material
41 cooling roll
42 guide roll
43 guide roll
44 guide roll
45 ionising rod
45a ionising rod
46 ionising rod
46a ionising rod
47 winding reel for finished product
48 transport device

What is claimed is:

1. A multilayer material of a heat-activated supporting film having defined shrinkability on a polyester substrate comprising:
   a polyester substrate having a first surface and a second surface, wherein the first surface has been surface-treated in a corona discharge unit;
   a polyurethane polymer adhered to the first surface and consisting essentially of the reaction product of a plurality of hydroxyl groups having a hydroxyl number below 5 and a linear polyisocyanate in a ratio of 20:1 with reference to solid polyurethane polymer, wherein the first surface is sufficiently roughened to facilitate bonding between the substrate and the polyurethane polymer; and
   an additive, wherein said additive is selected to be a catalyst to facilitate polymerization of the coating mixture in less than about 48 hours, a pigment, a colorant, or a mixture thereof.

2. The multilayer material of claim 1, wherein the substrate comprises polyethylene terephthalate and is laminated with a polyester fabric.

3. The multilayer material of claim 1, wherein a polyester fabric is laminated to the substrate with the polyurethane polymer.

4. The multilayer material of claim 3, wherein the polyurethane polymer is selected to be linearly structured and the polyisocyanate is selected to have an NCO content below 11.5 weight percent, wherein the polyurethane and the polyisocyanate have a ratio between about 8:1 and 12:1.

5. The multilayer material of claim 1, further comprising at least one of a transparent reactive layer on the second surface capable of receiving a printing material, and a metallic layer.

6. The multilayer material of claim 5, wherein both the reactive layer and metallic layer are present, and the reactive layer is disposed between the substrate and the metallic layer.

7. The multilayer material of claim 5, wherein the reactive layer has at least one of the property of light-sensitivity and a printing material disposed on said first surface or said second surface thereof.

8. The multilayer material of claim 5, wherein the reactive layer has a thickness of between 2 $g/m^2$ and 8 $g/m^2$.

9. The multilayer material of claim 5, wherein the reactive layer is an acetate.

10. The multilayer material of claim 5, wherein the reactive layer further comprises about 0.5 to 5 percent weight of an agent dispersed in the reactive layer to inhibit a blocking effect.

11. The multilayer material of claim 5, wherein the metallic layer comprises aluminum, chromium, or alloys thereof.

12. The multilayer material of claim 5, wherein the metallic layer has a thickness of less than about 1μ.

13. The multilayer material of claim 1, further comprising a contact adhesive layer disposed adjacent to the polyurethane polymer on the first surface.

14. A process for applying coatings to a multilayer material comprising:
   providing a supply of heat-activated supporting film having a defined shrinkability on a polyester substrate having a first surface and a second surface;
   feeding the substrate through a corona discharge unit to modify the first surface of the substrate;
   immediately thereafter applying a polymerizable polyurethane polymer coating mixture obtained by reacting a polymer having hydroxyl groups with a hydroxyl number less than 5 and a linear polyisocyanate in a ratio of 20:1 with reference to solid polyurethane polymer, at least one solvent, and one or more additives to the first surface of the substrate, wherein said additive is selected to be a catalyst to facilitate polymerization of the coating mixture in less than about 48 hours, a pigment, a colorant, or a mixture thereof;

drying the substrate to vaporize the at least one solvent and polymerize the coating mixture, wherein the first substrate is sufficiently modified to increase adhesion between the coating mixture and the first surface of the substrate;

cooling the coated substrate; and storing the substrate.

15. The process of claim 14, further comprising applying a transparent reactive layer to the second surface of the substrate.

16. The process of claim 15, wherein an agent is dispersed in the reactive layer to render the layer capable of receiving a printing material.

17. The process of claim 14, further comprising applying at least one of a contact adhesive layer to the first surface and a laminated coating to the first or the second surface.

18. The process of claim 17, wherein the laminated coating is disposed between the substrate and the adhesive layer.

19. The process of claim 14, further comprising hardening the coating mixture and then applying a metallic layer to the second surface in an amount sufficient to reduce the area weight of the multilayer material.

20. The process of claim 14, wherein the providing comprises unrolling the substrate from a reel and the storing comprises winding the substrate around another reel.

21. The process of claim 14, further comprising feeding the substrate between at least two ionizing rods to ground the substrate.

22. The process of claim 21, wherein each ionizing rod is placed in parallel with each other rod and perpendicular to the feeding of the substrate.

23. The process of claim 14, wherein the substrate is physically modified by sufficiently roughening the first surface to facilitate bonding between the substrate and the coating mixture.

* * * * *